(12) United States Patent
Yamamoto et al.

(10) Patent No.: US 6,987,721 B2
(45) Date of Patent: Jan. 17, 2006

(54) OPTICAL RECORD MEDIUM, OPTICAL INFORMATION PROCESSING APPARATUS, AND OPTICAL RECORDING/REPRODUCING METHOD

(75) Inventors: Hiroaki Yamamoto, Kawabe-gun (JP); Shin-ichi Kadowaki, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 431 days.

(21) Appl. No.: 10/343,355

(22) PCT Filed: Oct. 9, 2001

(86) PCT No.: PCT/JP01/08871

§ 371 (c)(1),
(2), (4) Date: Jan. 29, 2003

(87) PCT Pub. No.: WO02/31825

PCT Pub. Date: Apr. 18, 2002

(65) Prior Publication Data

US 2003/0174629 A1    Sep. 18, 2003

(30) Foreign Application Priority Data

Oct. 11, 2000   (JP)   .............................. 2000-310393

(51) Int. Cl.
*G11B 7/24* (2006.01)

(52) U.S. Cl. .................................................... 369/94
(58) Field of Classification Search ................ 369/94, 369/275.4; 428/53.5, 64.1, 64.5; 430/270.13

See application file for complete search history.

(56) References Cited

U.S. PATENT DOCUMENTS

| | | | | |
|---|---|---|---|---|
| 5,252,370 A | * | 10/1993 | Tominaga et al. | 428/64.5 |
| 5,381,391 A | | 1/1995 | Yanagisawa et al. | |
| 5,436,885 A | | 7/1995 | Okumura et al. | |
| 5,569,517 A | * | 10/1996 | Tominaga et al. | 428/64.1 |
| 5,615,206 A | | 3/1997 | Yanagisawa et al. | |
| 5,848,043 A | * | 12/1998 | Takada et al. | 369/53.3 |
| 6,159,571 A | * | 12/2000 | Jeong | 428/64.1 |
| 6,379,767 B1 | | 4/2002 | Park et al. | |
| 6,385,162 B1 | | 5/2002 | Nagase et al. | |
| 6,511,788 B1 | * | 1/2003 | Yasuda et al. | 430/270.13 |
| 6,596,366 B2 | * | 7/2003 | Ohno | 428/64.1 |
| 6,689,444 B2 | * | 2/2004 | Nakai et al. | 428/64.1 |
| 6,842,420 B2 | * | 1/2005 | Tsukuda et al. | 369/275.4 |

FOREIGN PATENT DOCUMENTS

| | | |
|---|---|---|
| JP | 6-60425 | 3/1994 |
| JP | 6-111372 | 4/1994 |
| JP | 6-267078 | 9/1994 |
| JP | 11-273149 | 10/1999 |
| JP | 2000-3529 | 1/2000 |
| JP | 2001-134981 | 5/2001 |

* cited by examiner

Primary Examiner—Tianjie Chen
(74) Attorney, Agent, or Firm—Hamre, Schumann, Mueller & Larson, P.C.

(57) ABSTRACT

A first recording layer and a second recording layer among a plurality of recording layers have a recording film and a reflection control film composed of silver oxide, and the reflection control film is interposed between dielectric films. The reflection control film utilizes heat generated from the recording film by light irradiation, thereby forming a high-reflection region in a portion at a temperature equal to or higher than a threshold temperature for forming a high-reflection region. Thus, an optical loss in the portions other than a recording layer to be recorded/reproduced is reduced, whereby a light efficiency is enhanced.

8 Claims, 7 Drawing Sheets

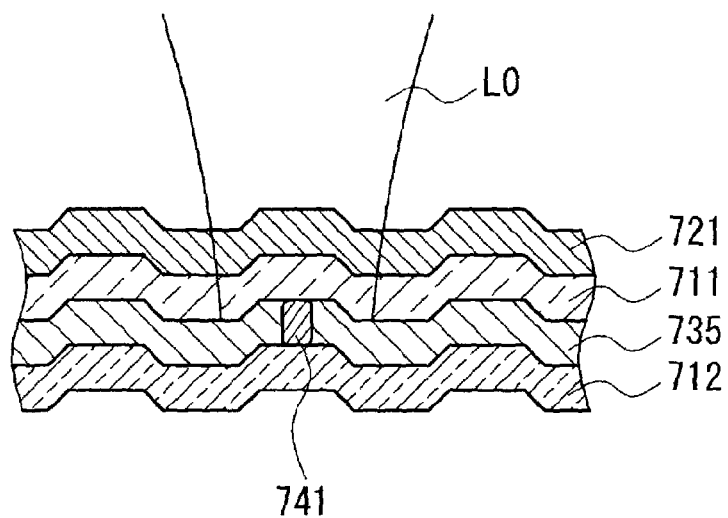
F I G. 4
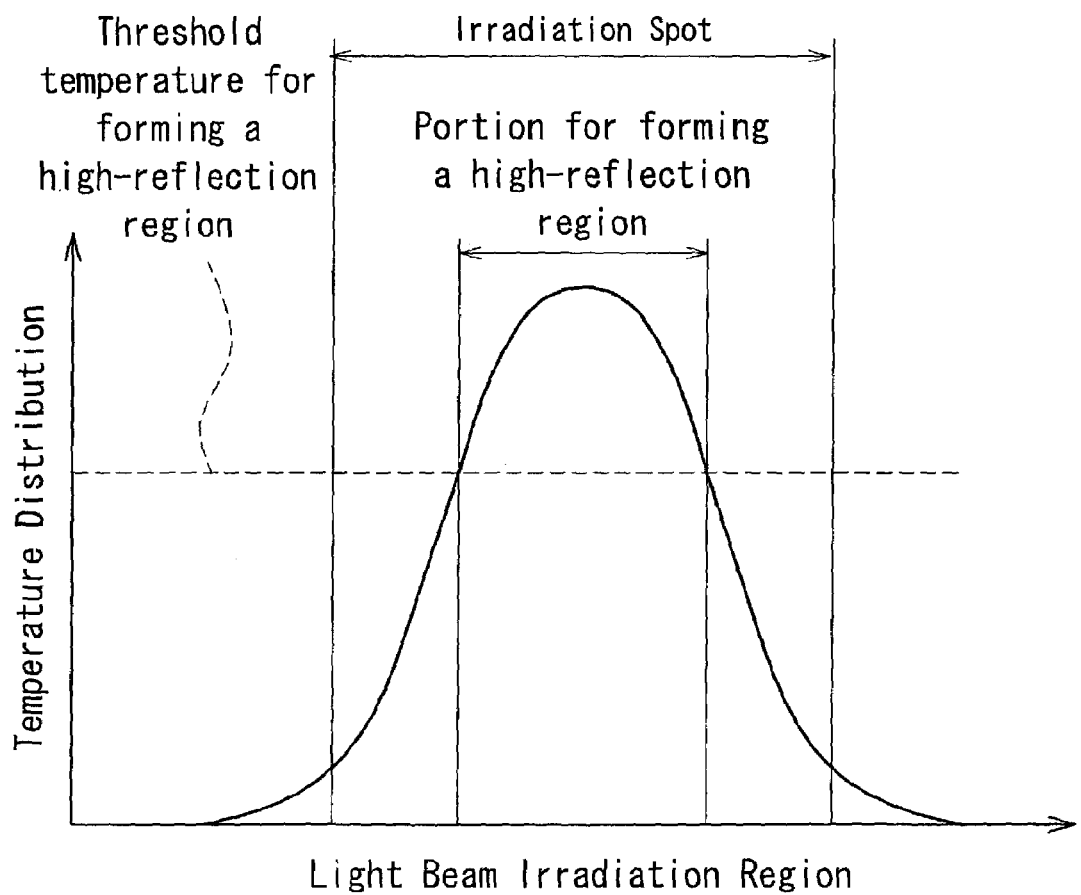
F I G. 5

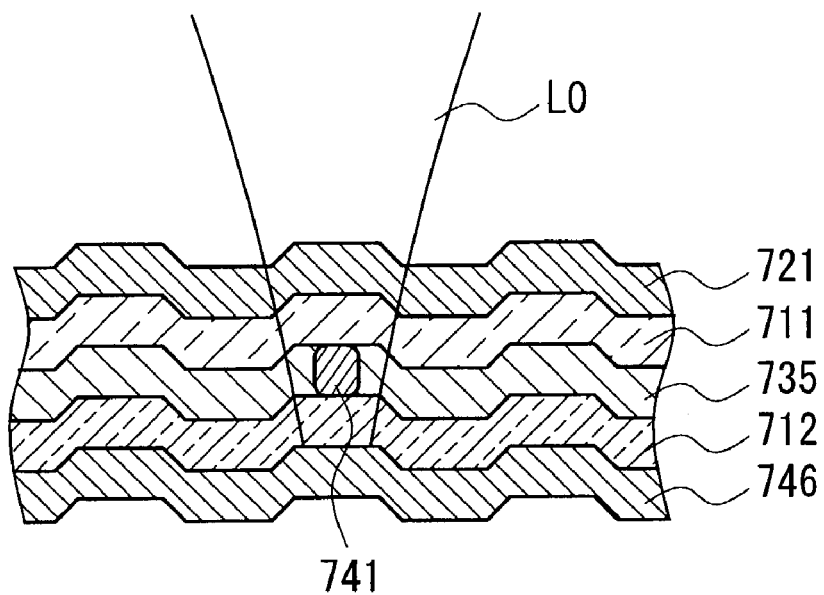
F I G. 6
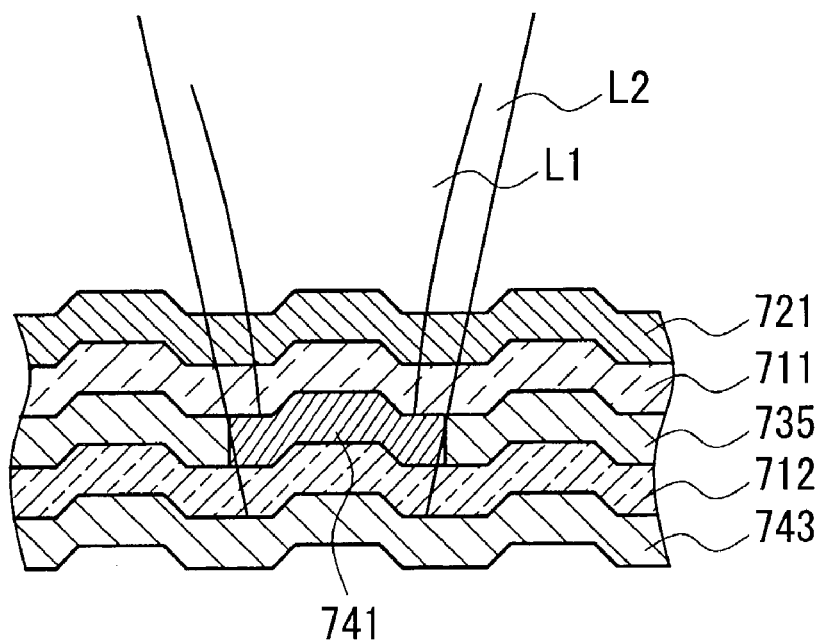
F I G. 7

OPTICAL RECORD MEDIUM, OPTICAL INFORMATION PROCESSING APPARATUS, AND OPTICAL RECORDING/REPRODUCING METHOD

TECHNICAL FIELD

The present invention relates to an optical recording medium for recording/reproducing information optically, such as an optical disk and an optical card, and an optical information processing apparatus and an optical recording/reproducing method for recording/reproducing information with respect to the optical recording medium.

BACKGROUND ART

Recently, along with the increasing computerization of the society, there is an increasing demand for external storage apparatuses with a large capacity. In optical recording of information, due to the diffraction limit determined by the wavelength of light and the numerical aperture of an objective lens, an increase in density by reducing the size of a recording pit conventionally is limited. In order to solve this problem, a multilayer optical recording medium having a plurality of recording layers has been proposed. As the recording layer used for a multilayer optical recording medium, a semi-transparent film capable of transmitting light as well as reflecting light is used. Therefore, an optical loss is caused by light reflection on a recording layer other than a target recording layer. Furthermore, assuming that the upstream side of a traveling direction of incident light is an upper side and the downstream side thereof is a lower side, transmitted light also reaches layers positioned on the lower side of a target recording layer, so that a further optical loss is caused. In order to solve this problem, a multilayer optical recording medium has been proposed, which uses a nonlinear material having nonlinear optical properties for recording layers (JP 2000-3529 A).

FIG. 10 is a cross-sectional view showing a configuration of a conventional multilayer optical recording medium. The optical recording medium shown in FIG. 10 has a first recording layer 12 and a second recording layer 16. The first recording layer 12 is positioned between a first light transmission film 10 and a second light transmission film 14. The second recording layer 16 is formed at a position opposed to the first recording layer 12 with the second light transmission film 14 interposed therebetween. The first recording layer 12 is provided with guide grooves 12A. The first recording layer 12 is formed of a nonlinear reflective material having a reflectivity that increases nonlinearly as the intensity of light increases. Examples of the nonlinear reflective material having such a property include a-Si, InSb, ZnTe, ZnSe, CdSSe, GaAs, GaSb and the like. The first recording layer 12 formed of the above nonlinear reflective material has a reflectivity R1 that varies by the following formula: $|(n-n_s)/(n+n_s)|^2$ (where: $n_s$ represents a refractive index of the first and second light transmission films 10 and 14 and n represents a refractive index of the first recording film 12 formed of a nonlinear reflective material). The nonlinear reflective material as used herein refers to a material whose refractive index varies depending upon the intensity of light, that is, a material with large nonlinear optical effects.

The optical properties of the above-mentioned optical recording media will be described. When information is recorded/reproduced with respect to the first recording layer 12, a light spot is formed thereon. Therefore, a light beam radiated to the first recording layer 12 becomes relatively strong. The reflectivity R1 of the first recording layer 12 is assumed to be 40% at this time. In contrast, when information is recorded/reproduced with respect to the second recording layer 16, a light spot is formed thereon. Therefore, a light beam radiated to the first recording layer 12 becomes relatively weak. Assuming that the reflectivity R1 of the first recording layer 12 is 30% at this time, the first recording layer 12 reflects 30% of incident light and transmits 70% thereof to the second recording layer 16. Accordingly, information can be recorded/reproduced with respect to the second recording layer 16 efficiently.

However, the reflectivity changes from 30% to 40% (i.e., only by 10%) in the disclosed prior art. This is because a material having nonlinear optical effects is employed for the first and second recording layers 12 and 16, which results in a light shortage for an increase in the number of layers.

SUMMARY OF THE INVENTION

In order to achieve the above-mentioned object, an optical recording medium of the present invention includes a plurality of recording layers, wherein at least one recording layer among the plurality of recording layers includes a recording film and a variable reflective film in this order from a light incident side, and the variable reflective film is made of a material that has transparency to light at a film temperature lower than a predetermined temperature and that has reflectivity to light at the film temperature equal to or higher than the predetermined temperature.

Further, in the optical recording medium of the present invention, it is preferable that the recording film is made of a material that generates heat by light irradiation, and a high-reflection region is formed in a portion of the variable reflective film where the film temperature reaches a temperature equal to or higher than the predetermined temperature by heating with heat generated from the recording film during light irradiation.

In the above-mentioned optical recording medium, when a light spot is formed on a recording layer to be recorded/reproduced, light radiated to a recording film provided in the recording layer becomes strong. As a result, heat is generated locally in the recording film, which results in an increased temperature therein. Because of this heat, a high-reflection region is formed in a variable reflective film of the recording layer to be recorded/reproduced, and most of incident light is reflected by the high-reflection region. Accordingly, the amount of a light loss can be reduced, enabling a signal to be detected with a high light efficiency. Further, even in the case of recording information, light reflected by the high-reflection region is increased, so that the amount of recording light is decreased, enabling recording with a high light efficiency to be conducted. Further, the optical recording medium uses the change in the variable reflective film from a transmission state to a reflection state. Therefore, a multilayer optical recording medium can be obtained, which has a higher light efficiency and a larger number of recording layers compared with a conventional optical recording medium using nonlinear optical effects.

The optical recording medium of the present invention also may be configured in such a manner that the recording layer further includes a heat generation film that generates heat by light irradiation on a side of the variable reflective film opposite to a light irradiation side, and a high-reflection region is formed in a portion of the variable reflective film where the film temperature reaches a temperature equal to or higher than the predetermined temperature by heating with heat generated from the heat generation film during light irradiation.

The above-mentioned optical recording medium has the effect that the variation in size of the high-reflection region can be suppressed, in addition to the effect of recording/reproducing with a high light efficiency.

The optical recording medium of the present invention also may be configured in such a manner that the recording layer includes a wavelength selection and heat generation film that generates heat by light irradiation in a predetermined wavelength range on a side of the variable reflective film opposite to a light irradiation side, and a high-reflection region is formed in a portion of the variable reflective film where the film temperature reaches a temperature equal to or higher than the predetermined temperature by heating with heat generated from the wavelength selection and heat generation film during light irradiation.

The above-mentioned optical recording medium can realize recording/reproducing with a higher light efficiency.

Further, in the optical recording medium of the present invention, it is preferable that the variable reflective film changes from a transmission state to a reflective state with respect to light due to a chemical change with heat. Further, it is preferable that the variable reflective film is made of a metal oxide, and contains at least one selected from the group consisting of silver oxide, tin oxide, indium oxide and zinc oxide.

Further, in order to prevent a material contained in the recording film and a material contained in the variable reflective film from generating a compound, and to confine a material generated by a chemical change of the variable reflective film, in the optical recording medium of the present invention, it is preferable that the variable reflective film is interposed between dielectric layers.

Further, in the optical recording medium of the present invention, it is preferable that the recording layer disposed at a farthermost position from a light irradiation side among the plurality of recording layers includes a recording film and a total reflective film in this order from a light incident side, and the total reflective film reflects incident light totally.

An optical information processing apparatus of the present invention for recording/reproducing information with respect to the optical recording medium of the present invention, includes: a first radiation light source; a second radiation light source; a light-condensing optical system that converges light emitted from the first and second radiation light sources to a minute spot on the optical recording medium; a photodetector for outputting a photocurrent in response to light reflected by the optical recording medium; and an optical system for guiding only first emitted light that is emitted from the first radiation light source and reflected by the optical recording medium into the photodetector, wherein second emitted light that is emitted from the second radiation light source is condensed into a spot at a position on the optical recording medium where the first emitted light is condensed, a spot size of the second emitted light being larger than that of the first emitted light.

In the above-mentioned optical recording/reproducing apparatus, information can be recorded/reproduced with respect to the optical recording medium of the present invention with a high efficiency.

An optical recording/reproducing method of the present invention for recording/reproducing information with respect to the optical recording medium of the present invention includes: forming a high-reflection region by partially changing the variable reflective film from a transmission state to a reflection state with respect to light with the use of heat generated by light irradiation; and recording/reproducing information with respect to the recording film. Further, a portion of the variable reflective film that is changed from the transmission state to the reflection state with respect to light with the use of heat generated by light irradiation is prescribed to be smaller than a spot size of light to be radiated, whereby super-resolution recording/reproducing can be conducted.

BRIEF DESCRIPTION OF DRAWINGS

FIG. 4 is a cross-sectional view showing that information is recorded/reproduced with respect to a recording layer of the optical recording medium of Embodiment 1 according to the present invention.

FIG. 5 shows a relationship between a light beam irradiation region and a temperature distribution of a recording layer.

FIG. 6 is a cross-sectional view showing that information is recorded/reproduced with respect to a recording layer of an optical recording medium of Embodiment 2 according to the present invention.

FIG. 7 is a cross-sectional view showing that information is recorded/reproduced with respect to a recording layer of an optical recording medium of Embodiment 3 according to the present invention.

BEST MODE FOR CARRYING OUT THE INVENTION

Hereinafter, the present invention will be described in more detail by way of embodiments.

Embodiment 1

Figure 1:
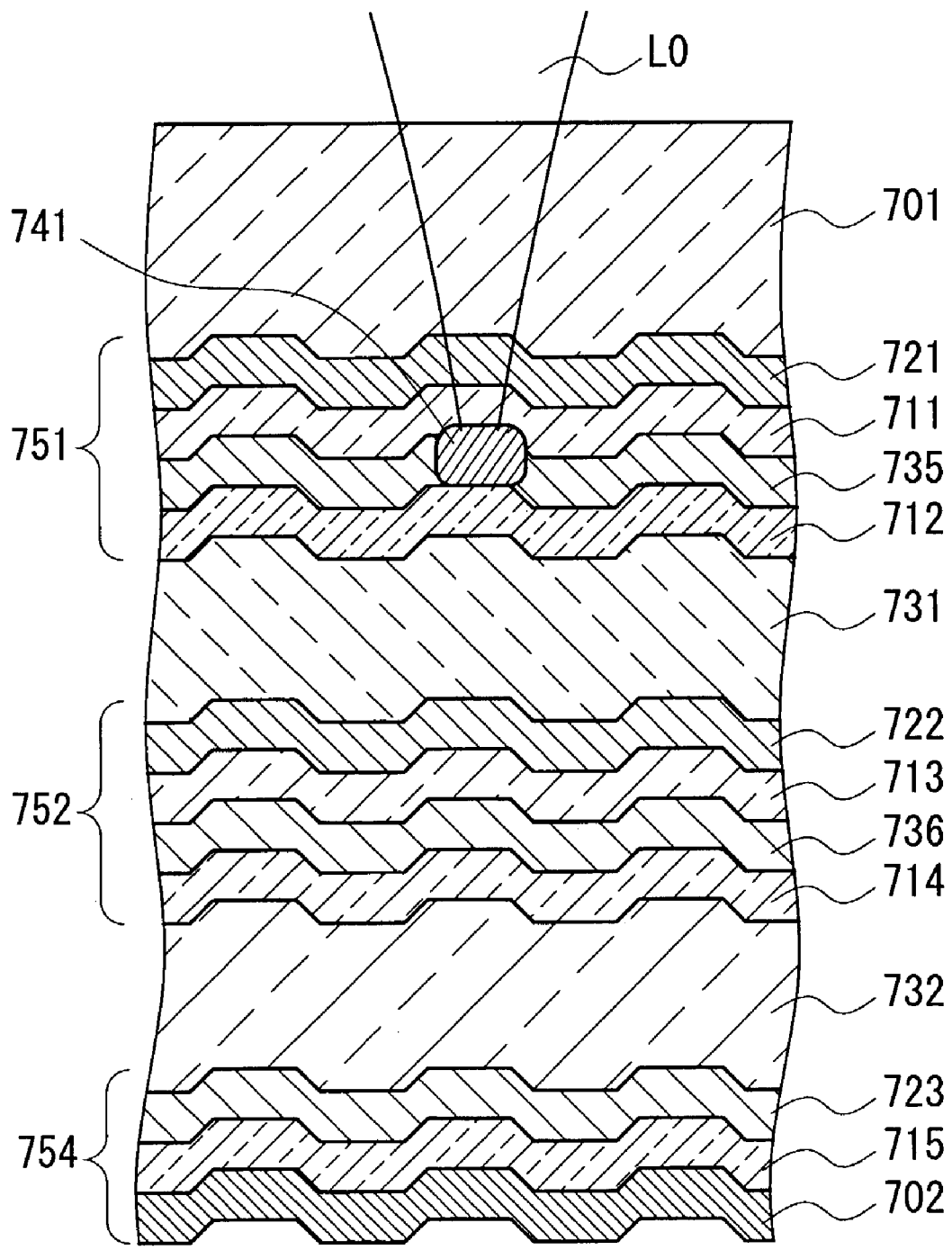
FIG. 1 is a cross-sectional view showing that information is recorded/reproduced with respect to a first recording layer of an optical recording medium of Embodiment 1 according to the present invention.

FIG. 1 is a cross-sectional view showing a configuration of an optical recording medium of Embodiment 1. This optical recording medium is a multilayer recording medium in which a first recording layer 751, a second recording layer 752 and a final recording layer 754 are formed in this order from a light (L0) incident side. Separation films 731 and 732 are provided between the respective recording layers.

The first recording layer 751 and the second recording layer 752 have the same layer configuration. In the layer configuration, a recording film 721 (722), a dielectric film 711 (713) and a reflection control film (variable reflective film) 735 (736), and a dielectric film 712 (714) are provided in this order from the light (L0) incident side.

Further, the final recording layer 754 is provided so that the separation film 732 is interposed between the final recording layer 754 and the second recording layer 752. The final recording layer 754 is composed of a recording film 723, a dielectric film 715 and a reflective film 702. In this configuration, the recording films 721 and 722 of the first and second recording layers 751 and 752 respectively are made of a recording material such as GeSbTe. The recording material such as GeSbTe becomes semi-transparent to light with a wavelength used for recording/reproducing and absorbs a part of incident light to generate heat.

The reflection control films 735 and 736 are made of silver oxide (AgOx). Silver oxide decomposes into silver and oxygen at a temperature equal to or higher than a decomposition temperature, thereby changing from a transmission state to a reflection state.

The dielectric films 711, 712, 713 and 714 are made of a transparent dielectric having a melting point (or a softening point) higher than the decomposition temperature of silver oxide, and serve to confine silver and oxygen generated by decomposition of the silver oxide. The dielectric films 711, 712, 713 and 714 can be formed of a mixture of ZnS and $SiO_2$, or the like.

Further, the dielectric film 711 (713) serves to prevent a material contained in the recording film 721 (722) and a material contained in the reflection control film 735 (736) from generating a compound. The separation films 731 and 732 serve to separate the respective recording layers optically and thermally, and are made of a transparent material (e.g., polymethyl methacrylate) that is thicker than the depth of focus of recording/reproducing light (L0). The respective recording layers are provided with guide grooves for specifying a recording position.

Hereinafter, the optical properties of an optical recording medium of the present embodiment will be described. When information is recorded/reproduced with respect to the first recording layer 751, a light spot of the incident light L0 is formed thereon. Therefore, a light beam radiated to the first recording layer 751 becomes relatively strong. Consequently, heat is generated locally in the recording film 721, which results in an increase in temperature. The heat is transferred to the reflection control film 735 via the dielectric film 711, which results in an increase in temperature of the reflection control film 735. Because of this, the temperature of the reflection control film 735 reaches the decomposition temperature of silver oxide, which decomposes the silver oxide into silver and oxygen, whereby a high-reflection region 741 is formed. Most of the incident light L0 is reflected by the high-reflection region 741. A reproduction signal is detected by detecting the reflected light.

Figure 2:
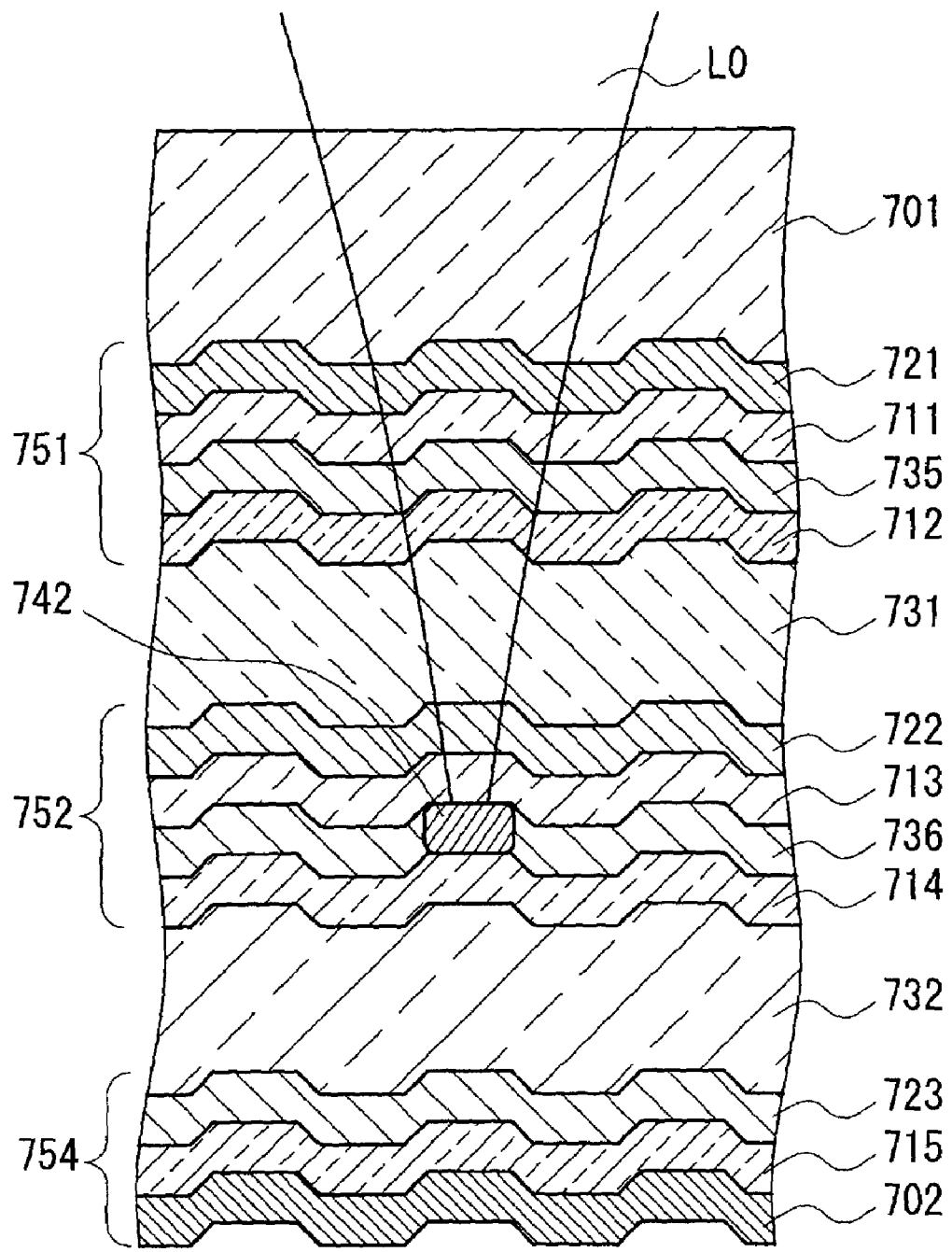
FIG. 2 is a cross-sectional view showing that information is recorded/reproduced with respect to a second recording layer of the optical recording medium of Embodiment 1 according to the present invention.

FIG. 2 shows the optical recording medium when information is recorded/reproduced with respect to the second recording layer 752. When information is recorded/reproduced with respect to the second recording layer 752, a light spot is formed thereon. Therefore, a heat generation region produced by absorption of the incident light is distributed in the recording film 721, which results in a small increase in temperature therein. This allows the reflection control film 735 to maintain the state of silver oxide and transmit the incident light therethrough. On the recording film 722, a light spot is formed in the same way as in the case where information is recorded/reproduced with respect to the first recording layer 751. Therefore, heat is generated locally in the recording film 722 and then a high-reflection region 742 is formed on the reflection control film 736. Most of the incident light L0 is reflected by the high-reflection region 742, and then, the reflected light is transmitted through the first recording layer 751. A reproduction signal is detected by detecting the reflected light.

Figure 3:
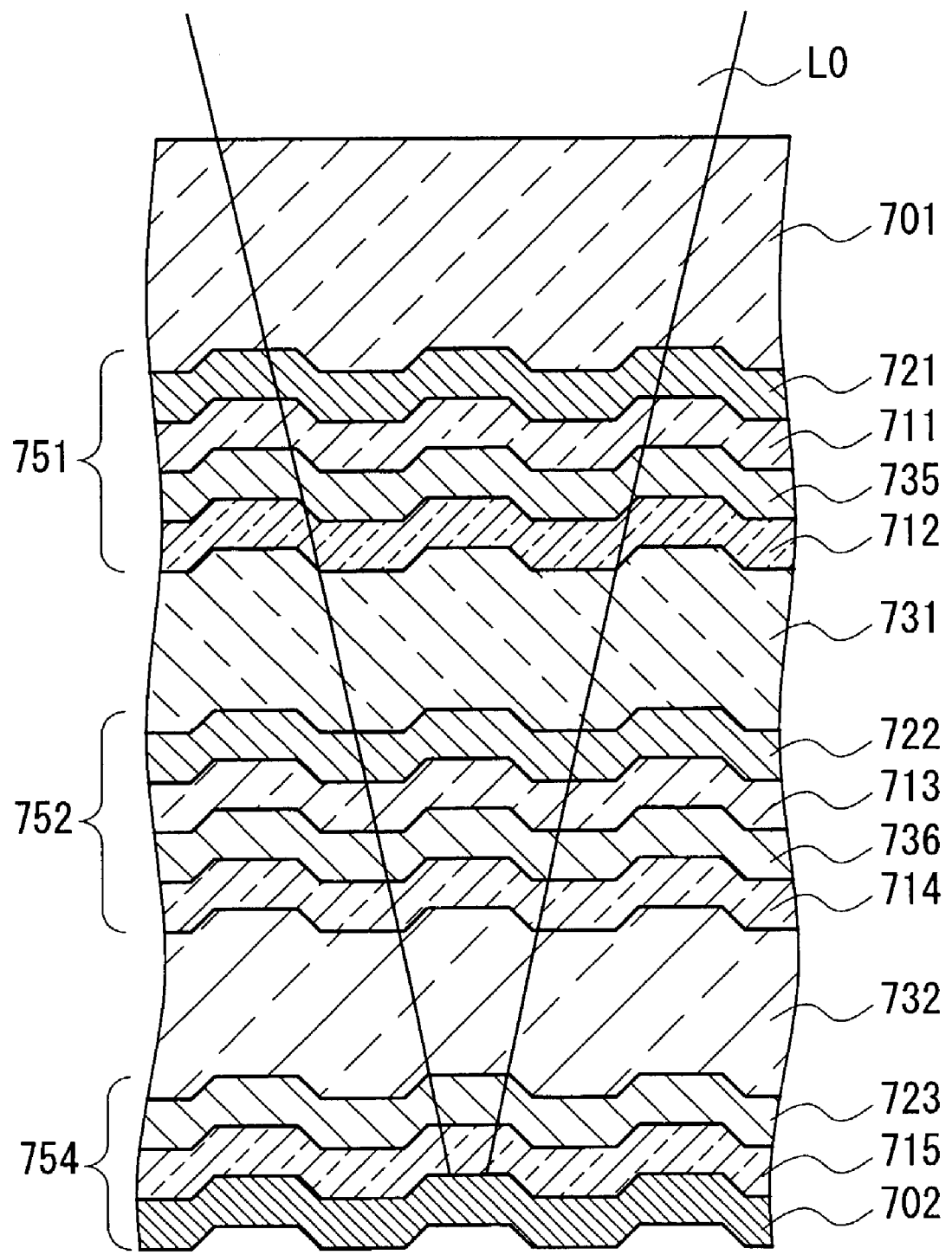
FIG. 3 is a cross-sectional view showing that information is recorded/reproduced with respect to a final recording layer of the optical recording medium of Embodiment 1 according to the present invention.

FIG. 3 shows the optical recording medium when information is recorded/reproduced with respect to the final recording layer 754. When information is recorded/reproduced with respect to the final recording layer 754, a light spot is formed thereon. Therefore, heat generation regions produced by absorption of the incident light are distributed in the recording films 721 and 722, which results in a small increase in temperature therein. This allows the reflection control films 735 and 736 to maintain the state of silver oxide, thereby transmitting the incident light therethrough. The light is reflected by the reflective film 702. The reflected light is transmitted through the second recording layer 752, and then the first recording layer 751. A reproduction signal is detected by detecting the reflected light.

As described above, the high-reflection regions 741 and 742 are formed on the corresponding recording layers only when information is recorded/reproduced. Therefore, a signal can be detected with a high light efficiency. The present invention utilizes the change in the reflection control films 735 and 736 from a transmission state to a reflection state. Therefore, it is possible to realize a multilayer recording medium that has a higher light efficiency and a larger number of recording layers as compared with a conventional optical recording medium utilizing nonlinear optical effects. Further, since the amount of the light reflected by the high-reflection regions 741 and 742 increases in recording information, the amount of recording light may be reduced, thereby realizing recording with a high light efficiency. The present embodiment has been described with reference to the case of the optical recording medium having three recording layers. However, the present invention is not limited thereto. The present configuration can be applied to an optical recording medium having two, or four or more recording layers. Further, the configuration using silver oxide for the reflection control films 735 and 736 has been described. However, the present invention is not limited thereto. Any material can be employed as long as it changes from a transmission state to a reflection state due to a chemical change with heat. For example, tin oxide, indium oxide, zinc oxide, or a combination thereof may be used.

In the optical recording medium of the present embodiment, reproduction of a mark equal to or less than a diffraction limit (so-called super-resolution recording/reproducing) is made possible. Hereinafter, the super-resolution recording/reproducing operation with respect to the optical recording medium of the present embodiment will be described.

FIG. 4 is a cross-sectional view illustrating a method for conducting super-resolution recording/reproducing by using the optical recording medium of the present embodiment. FIG. 4 shows that information is recorded/reproduced with respect to the first recording layer 751. In reproduction of the optical recording medium of the present embodiment, the high-reflection region 741 can be made smaller than the size of an irradiation spot. Hereinafter, a portion for forming the high-reflection region 741 will be described with reference to the relationship between the irradiation spot and the portion for forming the high-reflection region 741 shown in FIG. 5.

In the case of recording/reproducing information with respect to the optical recording medium of the present embodiment, the temperature distribution of the reflection control film 735 has a unimodal shape in which a central portion of the irradiation region is highest. The high-reflection region 741 is formed on a portion where the temperature of the reflection control film 735 is equal to or higher than a predetermined value (a threshold temperature for forming the high-reflection region). Accordingly, the intensity of radiating light L0 is selected for irradiation so that the size of a region at a temperature equal to or higher than the threshold temperature for forming the high-reflection region becomes smaller than that of the irradiation spot. Consequently, the high-reflection region 741 can be formed so as to have a size equal to or less than the irradiation spot as shown in FIG. 4. In this state, only light radiated to the high-reflection region 741 is reflected, so that the reflected light is not influenced by information recorded on a peripheral portion of the irradiation spot, whereby a signal can be detected with a high resolution.

Embodiment 2

An optical recording medium of Embodiment 2 is obtained by applying a configuration shown in FIG. 6 to the recording layers 751 and 752 other than the final recording layer 754 of the optical recording medium of Embodiment 1. FIG. 6 shows that information is recorded/reproduced with respect to the first recording layer 751.

In FIG. 6, reference numerals 711 and 712 denote dielectric films, and 735 denotes a reflection control film. These films are the same as those in Embodiment 1. A recording film 721 is substantially transparent to light L0, and records information based on the difference in a refractive index. A heat absorption and generation film 746 is made of a material semi-transparent to the light L0. For example, in the case where the light L0 is laser light with a wavelength of about 650 mm, a thin film of amorphous Si can be used as the heat absorption and generation film 746. The light L0 is absorbed by the heat absorption and generation film 746 to generate heat. The generated heat heats the reflection control film 735 via the dielectric film 712, thereby forming a high-reflection region 741. The condensed light is modulated due to diffraction caused by a refractive index distribution of the recording film 721, and then, is reflected by the high-reflection region 741. A reproduction signal is detected by detecting the reflected light.

In the optical recording medium of the present embodiment, heat is not generated by the recording film 721 as in Embodiment 1, but is generated by the heat absorption and generation film 746 that is provided separately. Thus, even when the recording film 721 is made of a material that does not generate heat by light irradiation, the same effect as that in Embodiment 1 (i.e., enhancement of a light efficiency) can be realized by providing the heat absorption and generation film 746.

Further, the above configuration also has the effect of suppressing the variation in size of the high-reflection region 741 due to the change in intensity of the light L0. Hereinafter, the principle of this operation will be described. When the amount of the light L0 is increased, the amount of heat generated at the heat absorption and generation film 746 is increased to enlarge the size of the high-reflection region 741. However, when the high-reflection region 741 is enlarged in size, the amount of light incident upon the heat absorption and generation film 746 is decreased, which also decreases the amount of heat generated at the heat absorption and generation film 746. Because of this, the high-reflection region 741 also is reduced in size. Consequently, the variation in size of the high-reflection region 741 can be suppressed.

In contrast, when the amount of the light L0 is decreased, the amount of heat generated at the heat absorption and generation film 746 is decreased, which reduces the size of the high-reflection region 741. When the high-reflection region 741 is reduced in size, the amount of light incident upon the heat absorption and generation film 746 is increased, whereby the amount of heat generated at the heat absorption and generation film 746 also is increased. Because of this, the high-reflection region 741 also is enlarged in size. Consequently, the variation in size of the high-reflection region 741 can be suppressed.

As described above, the optical recording medium can realize the effect that the heat generation absorption and generation film 746 smaller than a spot size can be formed stably without being influenced by the intensity of the light L0, and stable super-resolution reproduction can be made possible.

Embodiment 3

An optical recording medium of Embodiment 3 is obtained by applying a configuration shown in FIG. 7 to the recording layers 751 and 752 other than the final recording layer 754 of the optical recording medium of Embodiment 1. FIG. 7 shows that information is recorded/reproduced with respect to the first recording layer 751.

In FIG. 7, reference numerals 711 and 712 denote dielectric films. Reference numeral 735 denotes a reflection control film. These films are the same as those in Embodiment 1. A recording film 721 is substantially transparent to light L1 with a wavelength $\lambda 1$ and light L2 with a wavelength $\lambda 2$, and records information by utilizing the variation in refractive index with heat. A wavelength-selection and absorption film 743 is made of a material that is semi-transparent to the light L2, and is transparent to the light L1. For example, when the wavelength $\lambda 1$ of the light L1 is about 430 nm and the wavelength $\lambda 2$ of the light L2 is about 650 nm, the wavelength-selection and absorption film 743 can be formed of $SiO_2$ containing CoO, FeO and CuO.

Hereinafter, the principle of the above operation will be described. In recording/reproducing information with respect to the optical recording medium of the present embodiment, two light beams: light L1 and light L2 are radiated simultaneously. The light L2 is absorbed by the wavelength-selection and absorption film 743 to generate heat. The generated heat heats the reflection control film 735 via the dielectric film 712, thereby forming a high-reflection region 741. Further, the heat is transferred to the recording film 721, which results in an increased temperature therein. Information is recorded by raising the temperature of the recording film 721 to a recording temperature to change the refractive index of the recording film 721. In reproduction, a signal is detected by using the light L1 that is radiated simultaneously. The light L1 is transparent to all the films other than the high-reflection region 741, so that the light L1 is condensed to a target recording film efficiently. When the condensed light is transmitted through the recording film 721, the scattered amount thereof varies depending upon the distribution of the refractive index. Consequently, the amount of reflected light is modulated. A reproduction signal is detected by detecting the reflected light. The above configuration enables a signal to be detected with a high efficiency.

Embodiment 4

As an apparatus for recording or reproducing information with respect to the optical recording medium according to the present invention, one embodiment of an optical information processing apparatus will be described, which uses two radiation light sources for forming the high-reflection region 741 on the reflection control films 735 and 736.

Figure 8:
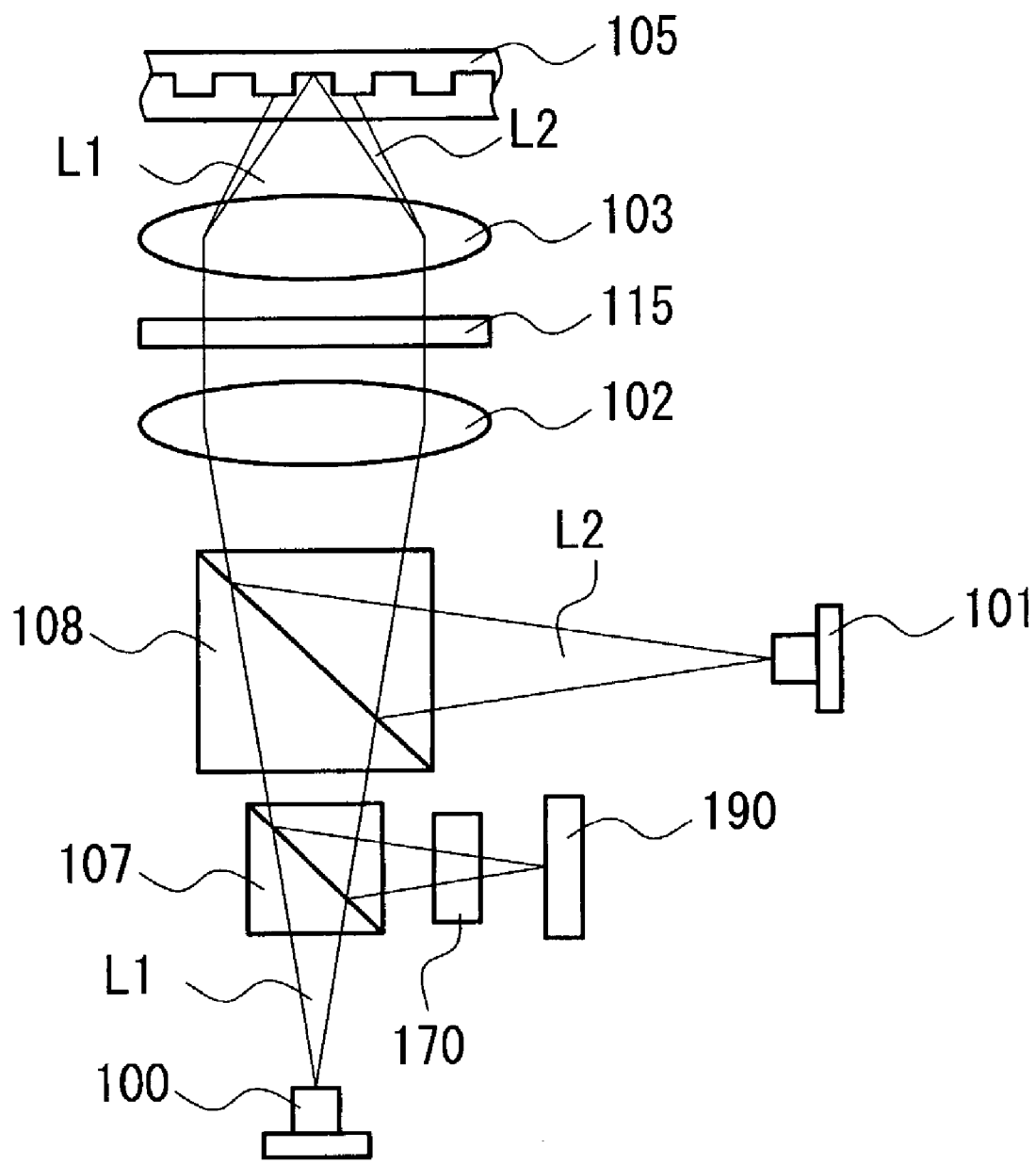
FIG. 8 is a view illustrating a configuration of an optical information processing apparatus of Embodiment 4 according to the present invention.

FIG. 8 shows a configuration of the optical information processing apparatus of the present embodiment. Light L1 with a wavelength $\lambda 1$ emitted from a first semiconductor laser 100 is transmitted through a polarized beam splitter 107 and a wavelength selection prism 108. Subsequently, it is converted to collimated light by a collimator lens 102 and converted to circularly polarized light by a quarter-wave plate 115. Further, the light is condensed by an objective lens 103 to a recording layer of an optical disk 105 with the same configuration as that of the optical recording medium of Embodiment 1 (outgoing path). The light reflected by the optical disk 105 is converted to collimated light by the objective lens 103 and converted by the quarter-wave plate 115 to linear polarized light that is different in phase by 90° from the circularly polarized light in the outgoing path. The light is transmitted through the wavelength selection prism 108 and reflected by the polarized beam splitter 107 to enter a hologram element 170. The light is deformed in wavefront by the hologram element 170 so as to take a servo signal and detected by a photodetector 190. Further, the optical information processing apparatus has a second semiconductor laser 101 that emits light L2 with a wavelength $\lambda 2$. The light L2 emitted from the semiconductor laser 101 is reflected by the wavelength selection prism 108 and condensed to the same position as that of the light L1 by the collimator lens 102 and the objective lens 103.

Figure 9:
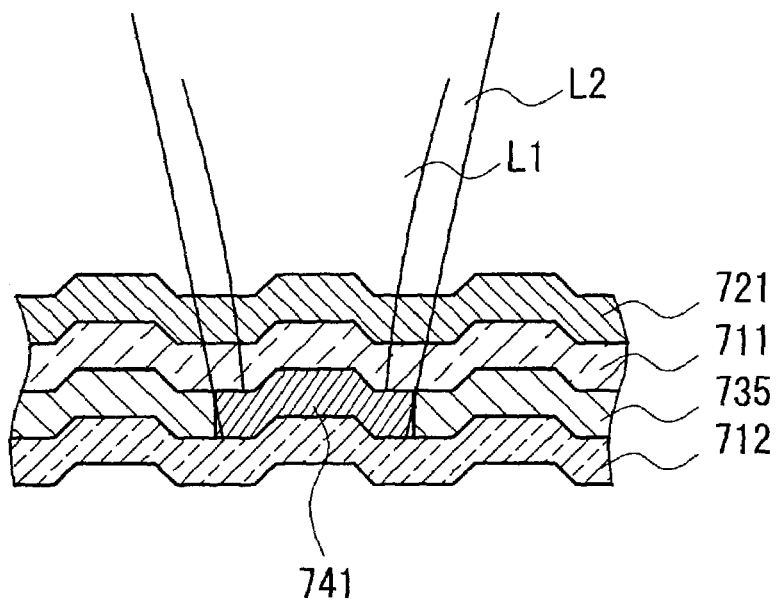
FIG. 9 is a cross-sectional view of an optical recording medium when information is recorded/reproduced with respect to a recording layer by using the optical information processing apparatus of Embodiment 4 according to the present invention.
Figure 10:
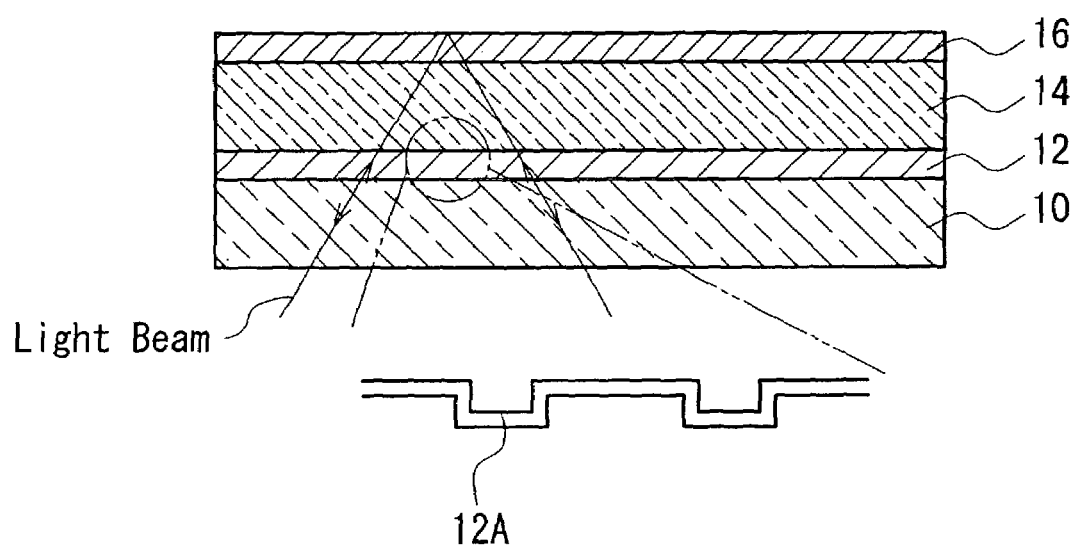
FIG. 10 is a cross-sectional view of a conventional multilayer recording medium.

FIG. 9 shows that the light L1 and the light L2 are condensed to a recording layer (herein, the first recording layer 751) of the optical disk 105 in the case of employing the optical information processing apparatus. The optical information processing apparatus is configured so that a light-condensing spot of the light L2 is larger than that of the light L1. This configuration is achieved by prescribing the wavelength $\lambda 2$ of the light L2 to be larger than the wavelength $\lambda 1$ of the light L1, shifting a light-condensing position in an optical axis direction of the light L2, or the like. The high-reflection region 741 is formed by the light L2 in a range larger than the light-condensing spot of the light L1. Therefore, the light L1 can be reflected efficiently in the detection of a signal.

As described above, information is reproduced from the optical recording medium of the present invention as described in Embodiments 1 to 3 by using the optical information processing apparatus with the above configuration, whereby a signal can be detected with a higher efficiency.

INDUSTRIAL APPLICABILITY

In the optical recording medium, optical information processing apparatus and optical recording/reproducing method of the present invention, a light efficiency is enhanced at the time of recording/reproducing, so that information can be recorded/reproduced with respect to a multilayer optical recording medium with a high efficiency.

What is claimed is:

1. A multilayer optical recording medium comprising a plurality of recording layers,
    wherein at least one recording layer among the plurality of recording layers includes a recording film and a variable reflective film in this order from a light incident side,
    the recording film is made of a material that generates heat by light irradiation, and
    the variable reflective film is made of a material that has transparency to light at a film temperature lower than a predetermined temperature and that has reflectivity to light at the film temperature equal to or higher than the predetermined temperature, and a high-reflection region is formed in a portion of the variable reflective film where the film temperature reaches a temperature equal to or higher than the predetermined temperature by heating with heat generated from the recording film during light irradiation.

2. A multilayer optical recording medium according to any one of claims 1, wherein the variable reflective film changes from a transmission state to a reflection state with respect to light due to a chemical change with heat.

3. A multilayer optical recording medium according to claim 2, wherein the variable reflective film is made of a metal oxide.

4. A multilayer optical recording medium according to claim 3, wherein the variable reflective film contains at least one selected from the group consisting of silver oxide, tin oxide, indium oxide and zinc oxide.

5. A multilayer optical recording medium according to any one of claims 1, wherein the variable reflective film is disposed so as to be interposed between dielectric layers.

6. A multilayer optical recording medium according to any one of claims 1, wherein the recording layer disposed at a farthermost position from a light irradiation side among the plurality of recording layers includes a recording film and a total reflective film in this order from a light incident side, and the total reflective film reflects incident light totally.

7. An optical recording/reproducing method for recording/reproducing information, comprising:
    forming a high-reflection region on the optical recording medium of claim 1 by partially changing the variable reflective film from a transmission state to a reflection state with respect to light with the use of heat generated by light irradiation; and
    recording/reproducing information with respect to the recording film.

8. An optical recording/reproducing method according to claim 7, wherein a portion of the variable reflective film that is changed from the transmission state to the reflection state with respect to light with the use of heat generated by light irradiation is smaller than a spot size of light to be radiated.

* * * * *

UNITED STATES PATENT AND TRADEMARK OFFICE
CERTIFICATE OF CORRECTION

| | | |
|---|---|---|
| PATENT NO. | : 6,987,721 B2 | Page 1 of 1 |
| APPLICATION NO. | : 10/343355 | |
| DATED | : January 17, 2006 | |
| INVENTOR(S) | : Yamamoto et al. | |

It is certified that error appears in the above-identified patent and that said Letters Patent is hereby corrected as shown below:

Col. 10, line 24: "any one of claims 1" should read --claim 1--
Col. 10, line 35: "any one of claims 1" should read --claim 1--
Col. 10, line 38: "any one of claims 1" should read --claim 1--

Signed and Sealed this

Twenty-ninth Day of August, 2006

JON W. DUDAS
*Director of the United States Patent and Trademark Office*